Aug. 9, 1966 A. SINILA ET AL 3,265,897
RADIOACTIVE SAMPLE CHANGING AND MEASURING APPARATUS
Filed Nov. 5, 1962 5 Sheets-Sheet 1

Alexander Sinila
Charles E. Soderquist, Jr.
Walter Meier
INVENTORS by Ooms, McDougall & Hersh
Attys Alexander Sinila
Charles E. Soderquist, Jr.
Walter Meier
INVENTORS by Ooms, McDougall & Hersh
Attys

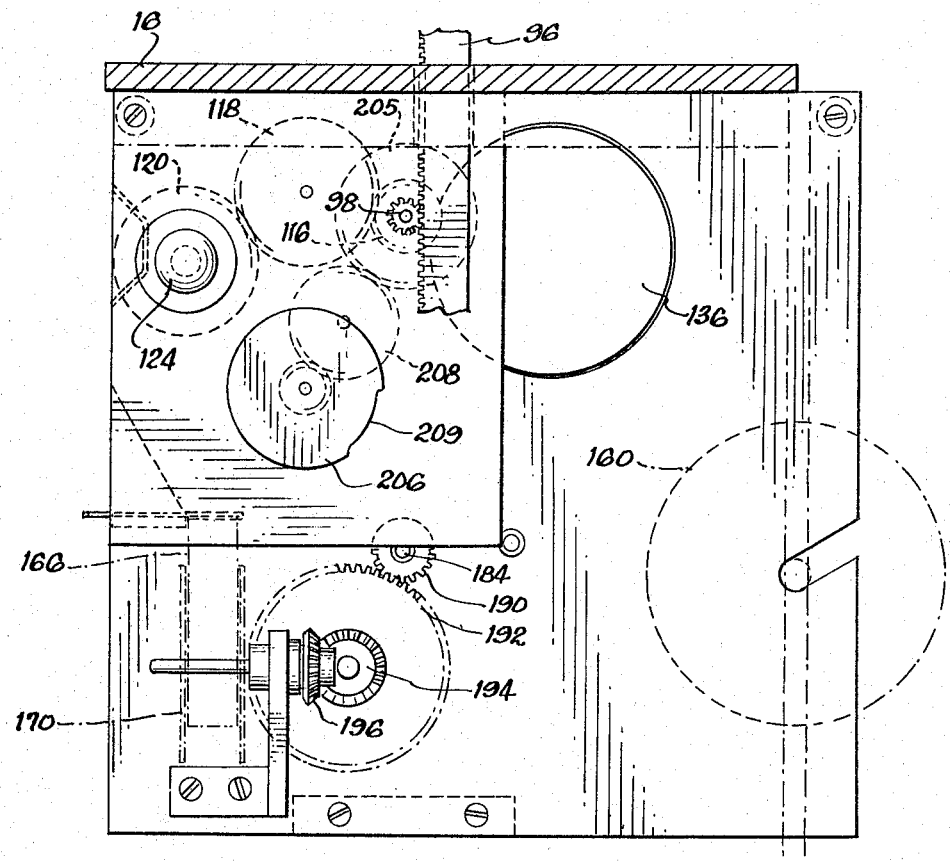
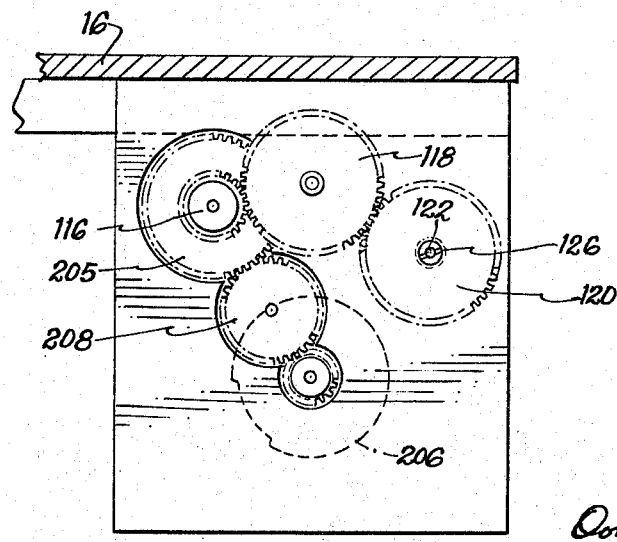
FIG. 8
FIG. 9 form # United States Patent Office 3,265,897
Patented August 9, 1966

3,265,897
RADIOACTIVE SAMPLE CHANGING AND
MEASURING APPARATUS
Alexander Sinila, Dolton, Charles E. Soderquist, Jr., Chicago Heights, and Walter Meier, Chicago, Ill., assignors to Nuclear Data, Inc., Palatine, Ill., a corporation of Illinois
Filed Nov. 5, 1962, Ser. No. 235,476
17 Claims. (Cl. 250—106)

This invention relates to an apparatus for use in the handling of samples which are to be measured for their radioactivity. In particular, the apparatus of this invention is designed for use in laboratories and in other operations where radioactive materials are handled.

In biological, medical, and radiochemical laboratories and in certain other operations, the use of large numbers of radioactive samples or specimens is encountered. For various technical reasons, it is desirable to provide means in these laboratories for taking "counts" for such samples whereby a measure of the radiation therein will be provided.

In the past, personnel in such operations manually performed the task of handling the samples whereby a radiation count could be effected. This operation generally involved manually placing each sample in a location adjacent to a radiation detection device after which the samples were manually removed. Because of the time consuming nature of this operation and due to the increased number of samples for testing, certain mechanical devices have been provided for increasing the efficiency of the operation. Such devices have provided means for inserting a large number of samples which could be mechanically moved to a radiation detector and suitable counting, timing, and recording means were integrated with the sample moving means.

For various reasons, the automatic sample changers presently available are considered unsuitable. In virtually every instance, the sample handling means devised have been characterized by a relatively complicated operating structure whereby the costs of construction and the maintenance of the units have been extreme. Where complex operating structures are employed, the units have also proven undesirable since such structures tend to require a large amount of space when set up in a laboratory.

In some instances, attempts have been made to provide less complicated structures, however, these devices are characterized by a more time consuming nature whereby the advantage over a manual operation is diminished. Thus, the time necessary for loading and unloading the samples to be tested, the time necessary for moving samples toward and away from a radiation counter and the time necessary for operating and resetting the counting means have been unduly great.

It is an object of this invention to provide an apparatus for the handling of samples employed in biological, medical, radiochemical and similar laboratories whereby the radiation which characterizes these samples can be measured in a highly efficient manner.

It is an additional object of this invention to provide a system for the measuring of radioactive samples which overcomes difficulties presented by prior art systems for the reason that the system of this invention is fully automatic, provides for rapid counting of samples, and involves a relatively uncomplicated operating principle.

It is a further object of this invention to provide an apparatus for the handling of samples characterized by radioactivity, which apparatus is adapted to provide for rapid movement of samples to and from a counting position, and which is characterized by a recording mechanism which in no way delays the operating cycle of the apparatus.

These and other objects of this invention will appear hereinafter and for purposes of illustration but not of limitation specific embodiments of this invention are shown in the accompanying drawings in which:

FIGURE 8 is an elevation taken from the side opposite FIGURE 6; and

FIGURE 9 is a detail view of a distinct gear arrangement for the indicating and printing wheels.

The present invention is generally directed to an apparatus which supports a vertically disposed magazine which is adapted to receive a plurality of holders containing samples. In order to provide a count of the radiations which characterize these samples, a radiation counter is provided in the apparatus and unique means are adapted to move the samples, one at a time, from the magazine into the vicinity of the radiation counter. At the completion of the counting operation, the samples are adapted to be returned, one at a time, to the magazine and a new sample positioned in the moving means while the previous sample is deposited in the magazine.

In the preferred form of this invention, a disc which defines an aperture for receiving a sample holder is adapted to be rotated into communication with the magazine at which time a previously counted sample is automatically discharged from the disc and a new sample is positioned within the aperture for transfer to the vicinity of the radiation counter. The vertically disposed magazine is provided with a novel means for supporting a stack of samples and for driving the support means whereby changing of the samples is accomplished in an extremely rapid and simple manner.

The apparatus of this invention also provides unique means for calculating the counts per unit time for each of the samples handled by the apparatus. Means are provided for initiating a recording operation without delay as soon as a sample is positioned in the vicinity of the radiation counter. After completion of the counting operation, means are provided for permanently recording the time elapsed or the counts detected and these means operate during the sample changing interval of the apparatus whereby a permanent record can be made and the recording means reset by the time a new sample is positioned for counting.

Figure 1:
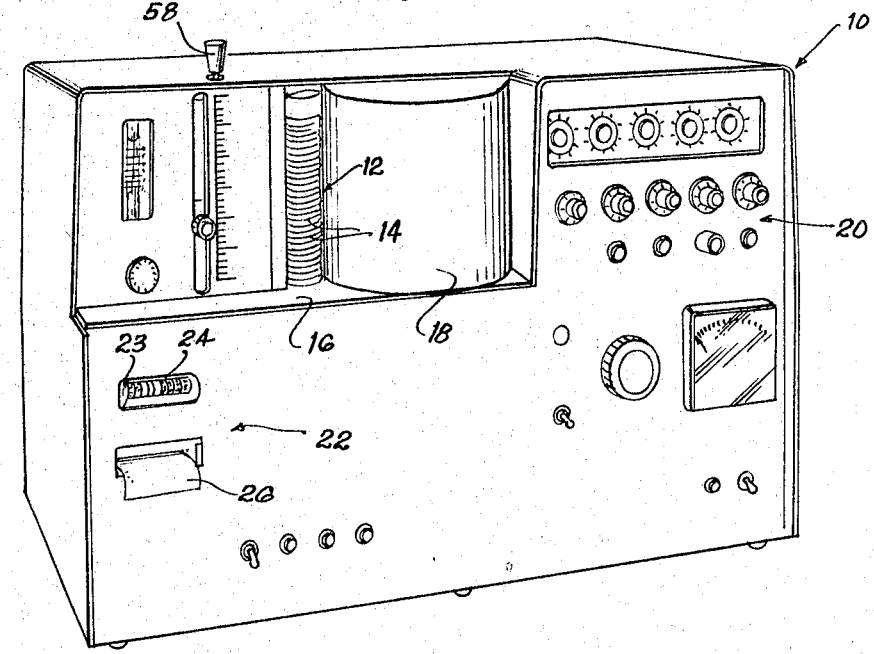
FIGURE 1 is a perspective view of the apparatus of this invention illustrating the operating dials and various other components visible from the outside of the apparatus housing.

The accompanying drawings will provide a detailed description of the above noted inventive characteristics and will also serve to illustrate other novel details exhibited by the apparatus of this invention. FIGURE 1 illustrates a typical apparatus which includes a housing 10 for supporting a magazine 12 which in turn confines a stack of sample holders 14. An outer plate 16 is horizontally disposed in the housing and this plate provides a support for an annular lead shield 18.

The operation of the disclosed apparatus will be described with reference to a system which provides for the reaching of a predetermined count by the radiation detecting means. A timing mechanism is associated with the counting means whereby the time elapsed during reaching of the predetermined count can be recorded and the counts per unit of time can thus be calculated. It will be understood, however, that the mechanical features of this invention can be utilized in combination with a system wherein each sample is tested for a constant period of time, and the number of counts per unit of time are calculated on this basis.

The dials located in the section 20 on the front face of the housing are provided for setting a predetermined number of counts. In the section 22 of the housing, there is located a digital indicating means which is utilized for recording at 23 the sample number being counted and at 24 the time elapsed during counting. A paper tape 26 is utilized for providing a permanent record of the sample number and elapsed time for each of the samples.

Figure 2:
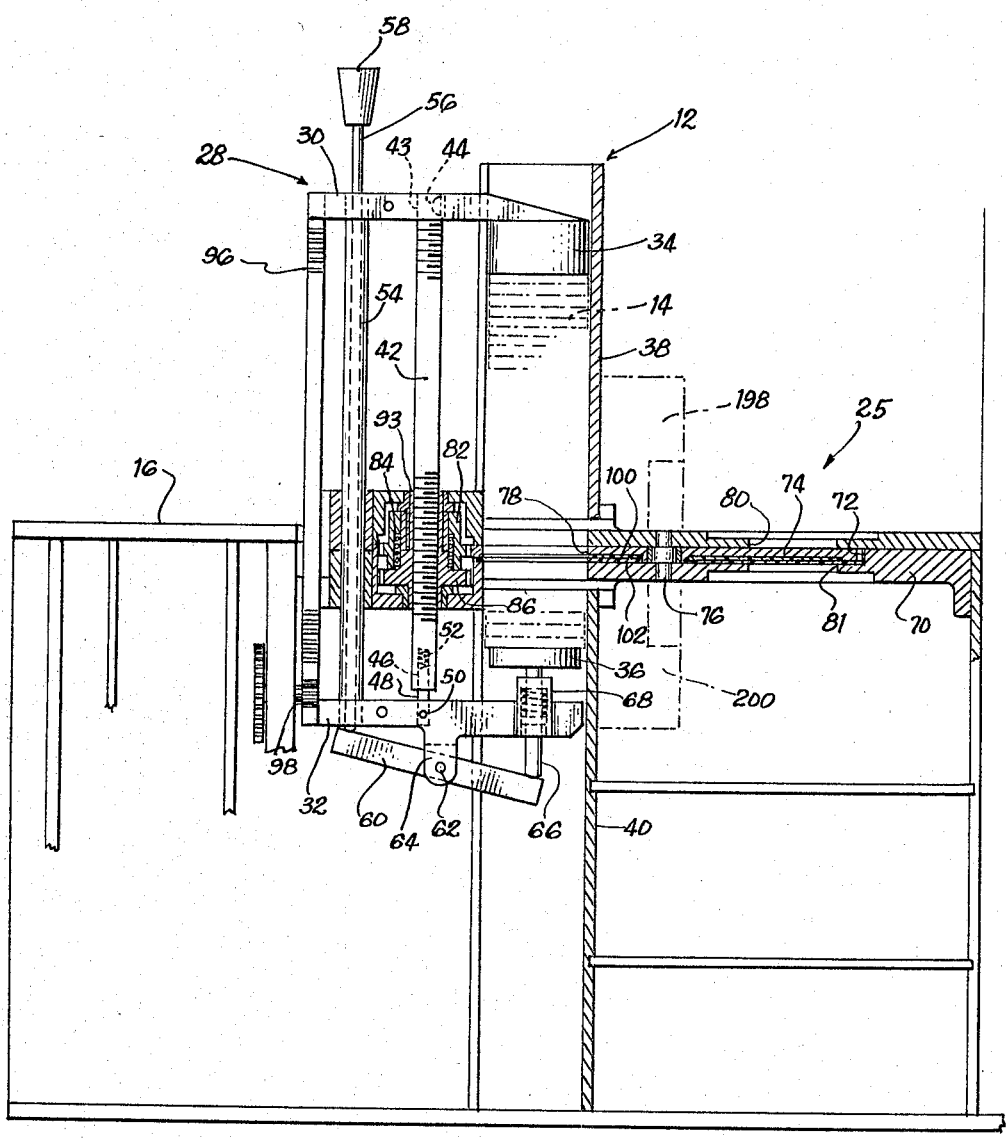
FIGURE 2 is an elevational view partly in section of the sample handling and changing mechanism.
Figure 3:
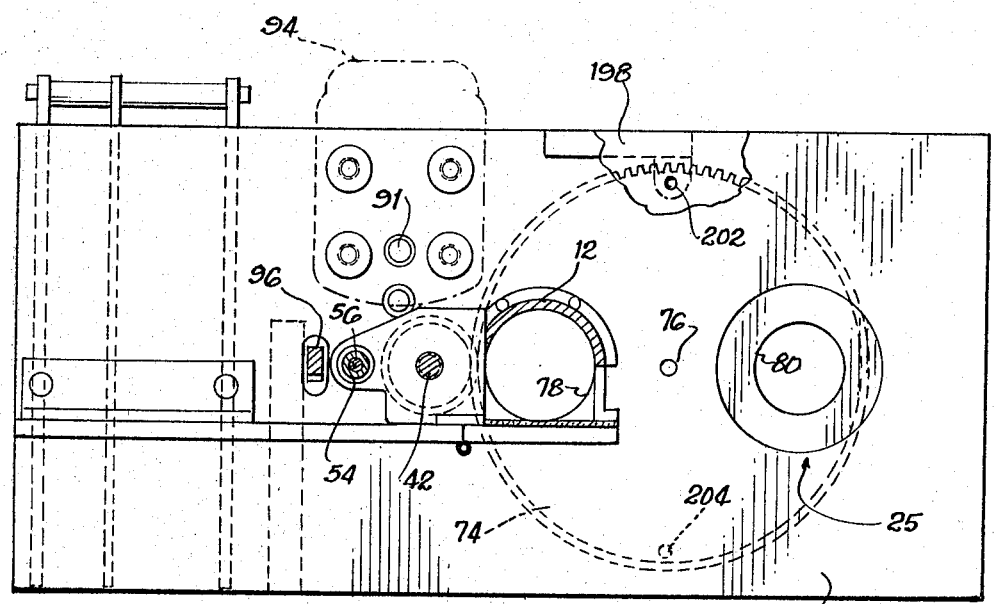
FIGURE 3 is a plan view of the mechanism shown in FIGURE 2.
Figure 4:
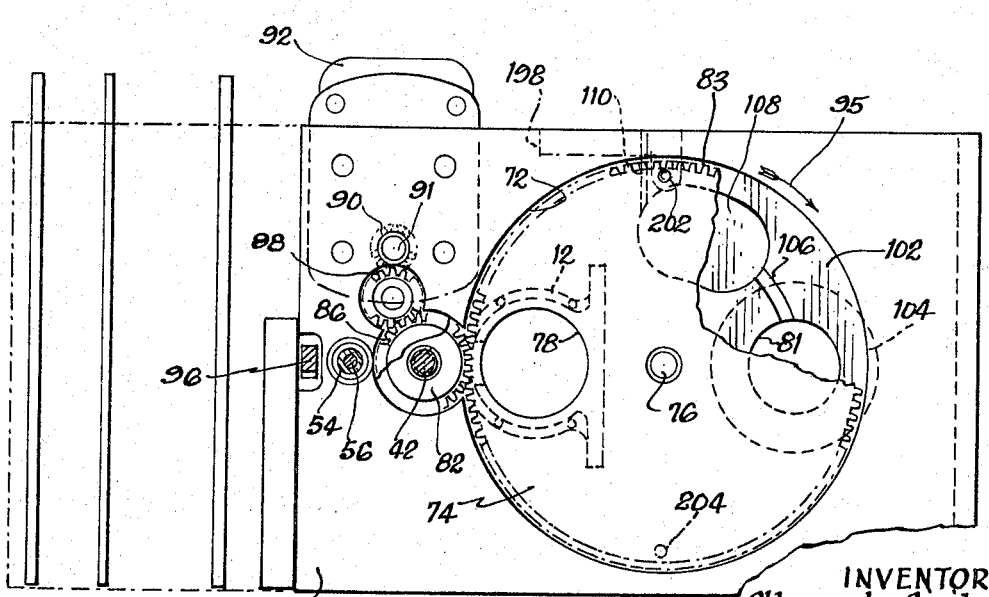
FIGURE 4 is a plan view of the mechanism shown in FIGURE 2 with a top plate removed.
Figure 6:
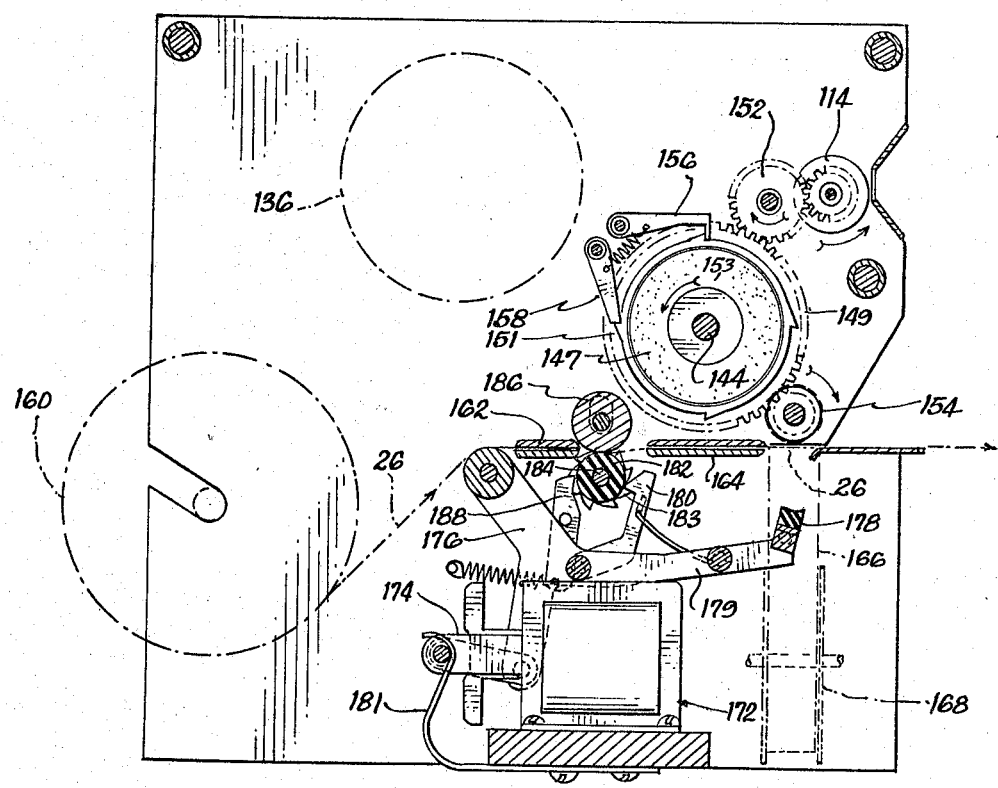
FIGURE 6 is a side elevation of the mechanism shown in FIGURE 5.
Figure 7:
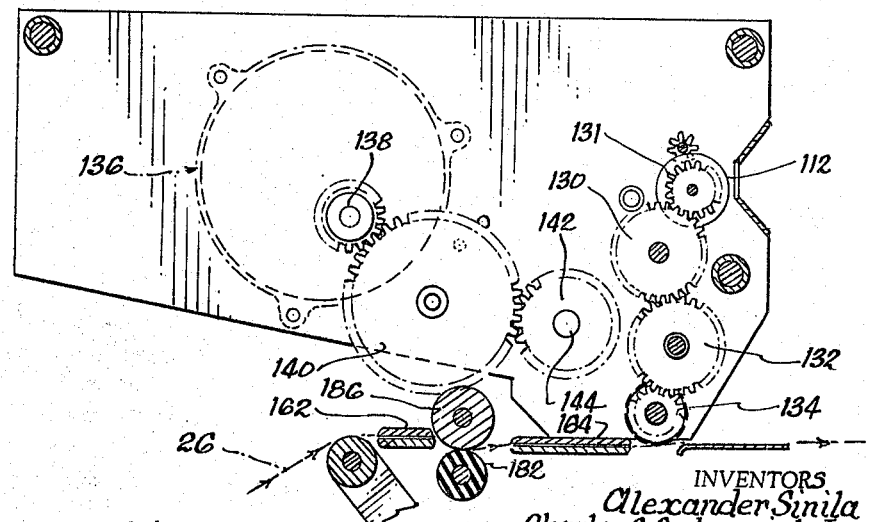
FIGURE 7 is a fragmentary side elevational view illustrating the gear arrangement for the indicating and printing wheels.

FIGURES 2 through 4 illustrate the operating structure for the changing of samples whereby the samples can be moved from the magazine 12 to the radiation counting section 25 of the apparatus. The structure illustrated includes a C-shaped member 28 which includes upper and lower arms 30 and 32. These arms terminate in respective holder engaging portions 34 and 36 and a stack of holders 14 is adapted to be supported between these portions. The upper section 38 of the magazine confines the samples yet to be counted while the lower section is provided for receiving holders of samples as they are counted.

A screw 42 has one end disposed within a bushing 43 fitted within the arm 30. The opposite end of the screw 42 defines a bore 46 and a pin 48 fastened to the arm 32 at 50 rides freely within this bore. A spring 52 normally urges the screw 42 away from the arm 32, however, it will be apparent that the screw is permitted limited vertical movement relative to the arms 30 and 32. Element 44 formed in the upper end of the screw extends into the bushing 43 and prevents rotary movement of the screw relative to the arm 30 but allows downward vertical movement relative to this arm.

Also disposed between the arms 30 and 32 is a tubular member 54. A rod 56 is received within the bore of the tubular member and a handle 58 which is accessible from the outside of the housing permits vertical movement of the rod within the member 54. A lever 60 is pivotally mounted at 62 on an extension 64 of the arm 32. This lever is adapted to be pivoted when engaged by the lower end of the rod 56, and this pivotal movement transmits vertical movement to the stem portion 66 of the holder engaging portion 36. A spring (not shown) is situated within the portion 68 formed in the arm 32, and this spring normally urges the portion 36 downwardly to the position shown in FIGURE 2. Accordingly, pressure exerted on the handle 58 serves to raise the portion 36 in opposition to this spring.

Located beneath the plate 16, there is provided an additional stationary plate 70. These two plates define a space 72 within which is confined the disc 74. This disc is mounted on pin 76 which is journaled for rotary movement in the plates 16 and 70.

The disc 74 defines an aperture 78 which is dimensioned to receive one of the holders 14. During rotary movement of the disc, the aperture 78 is adapted to register with the magazine 12 in one portion of its cycle and registers with the openings 80 and 81 defined in the plates during a separate portion of its cycle.

The disc 74 is provided with gear teeth 83 on its periphery and these teeth engage upper gear 82 positioned adjacent the magazine 12. The gear 82 is connected through a spring clutch mechanism 84 to a lower gear 86. An idler 88 engages the gear 86 and drive pinion 90 which is connected to the shaft 91 operates to rotate the gear 86. A motor 92 is adapted to drive the pinion 90 in a counterclockwise direction whereby a clockwise rotation, as suggested by the arrows 95, is imparted to the disc 74. When the gear 86 is rotated through operation of the motor 92, the clutch 84 is engaged whereby the gear 82 is adapted to drive the disc 74 in the manner described.

It will be noted that the gear 86 is provided with an elongated cylindrical portion 93 and this portion is internally threaded whereby rotation of the gear 86 effects vertical movement of the screw 42. When the motor 92 operates in the manner above described, the screw 42 moves downwardly, and, accordingly, this downward movement of the screw takes place during rotation of the disc 74.

An additional motor 94 is mounted on the top of the plate 16. This motor is also adapted to drive the shaft 91, however, in this case, the shaft is rotated in a clockwise direction. A clockwise movement is also imparted to the gear 86 when the motor 94 is operating, however, the clutch 84 is adapted to disengage at this time whereby the disc 74 will not rotate. It will be apparent that the reverse movement of the gear 86 will impart upward movement to the screw 42. Accordingly, the motor 94 is made operative when it is desired to raise the C-shaped member 28 for unloading thereof or for the purpose of rereading a particular sample. The motor 94 is preferably of relatively high speed compared to the motor 92 whereby reversal or unloading can be effected quickly with a minimum of delay.

Also secured to the C-shaped member is a rack 96. This rack engages pinion 98 during its vertical movement and this pinion is adapted to operate a digit indicating wheel whereby the sample number being handled by the apparatus at a particular time can be displayed. As will appear hereinafter, the provision of the rack means for controlling the display of a sample number eliminates mix-up since the sample number displayed is determined by the particular holder which is in position for reading.

It will be noted that the disc 74 is recessed over its bottom surface and an insert 100 of Teflon or a similar bearing material having lubricating characteristics, is disposed within this recess. The plate 70 also confines a similar insert 102 and each of these facing inserts are dimensioned to cover substantially the whole area of the disc 74. This combination finds particular utility where a gas flow radiation detector is employed. With such a detector, gas is introduced into the detecting zone 104 adjacent the openings 80. The gas passes through channel 106 formed in the insert 102 and then into an air purging chamber 108. The gas is exhausted from the system through the bore 110.

When the disc 74 receives a holder 14 in the aperture 78 and begins rotation toward the radiation detecting zone, the holder comes into communication with the chamber 108. The circulating counting gas serves to draw air carried with the holder out through the bore 110. The facing Teflon inserts tend to restrict the presence of air between the discs and the plate 70, which air would otherwise impair the operation of the radiation detecting means.

FIGURES 5 through 9 illustrate the structure which is provided for indicating and recording the sample number and time corresponding to each sample handled by the apparatus. The indicating wheels 112 provide a digital representation of a sample number, while the indicating wheels 114 are provided for a time indication.

As previously noted, the rack 96 and the pinion 98 are provided for operating the wheels 112. The shaft of the pinion 98 is connected to the gear 116, and this gear in turn rotates the gear 120 through idler 118. The shaft 122 which is keyed to the wheels 112 is operated by the gear 120. This shaft rides freely within the wheels 114 so as not to effect the digital indications thereof. It will be noted that a knob 124 is provided with a slotted end 126 which receives pin 128 extending from the shaft 122. By pulling the knob 124 against the action of spring 129, the shaft 122 can be released for manual setting of the sample numbers.

Rotation of the wheels 112 results in the rotation of gears 131 associated therewith whereby idlers 130 and 132 will be rotated. These idlers effect the rotation of printing wheels 134 which permit permanent recording of the sample number in a manner to be explained.

A synchronous motor 136 is fitted within the housing and the drive pinion 138 of this motor is adapted to rotate idler 140 and associated gear 142. The shaft 144 is tied to magnetic clutch wheels 146 which comprises permanent magnet portions 147 and rims 149. These rims have gear teeth 148 formed in their peripheries and ratchet teeth 150 and 151 are provided on either side of the gear teeth on each of the rims. Idlers 152 engage the gear teeth 148 whereby rotation of the rims 149 will rotate indicating wheels 114. The gear teeth also engage printing wheels 154 for concurrent rotation thereof.

Figure 5:
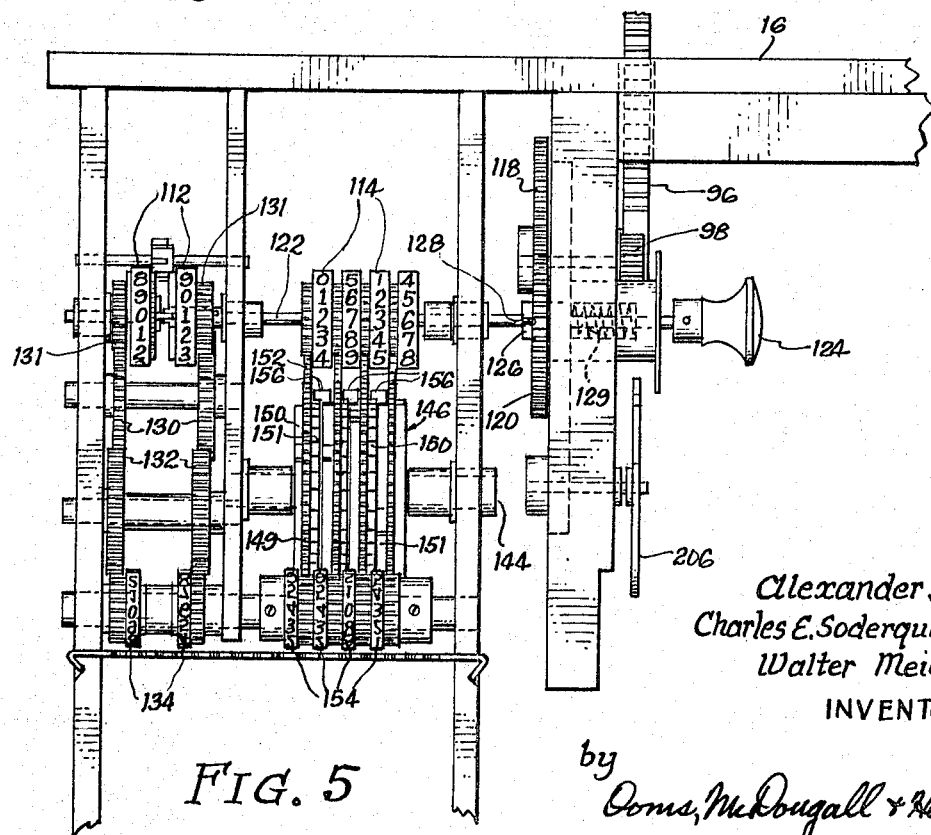
FIGURE 5 is a fragmentary view illustrating the digit indicating and printing means of the apparatus.

In a typical embodiment, a 4:1 gear ratio exists between the rims 149 and the indicating wheels 114 whereby a quarter turn of the rims will result in a full turn of the indicating wheels. The ratchet teeth 151 are located to engage pawls 156, and these ratchet teeth are spaced at 90° intervals whereby they will engage a pawl during each quarter turn. As shown in FIGURE 5, the pawls 156 are adapted to engage the teeth 151 on one rim and the teeth 150 on an adjacent higher digit rim. Accordingly, during each quarter turn a lower digit rim will effect release of a pawl for an adjacent higher digit rim, and the pawls are stepped in this manner in accordance with the number of revolutions of the indicating wheels.

As previously indicated, the wheels 146 are magnetic clutch wheels wherein the magnet portions 147 are tied to the shaft 144 and rotate whenever the motor 136 is operative. The rims 149 are attracted by the magnets and they will therefore rotate whenever a pawl is released.

Four resetting pawls 158 are adapted to engage ratchet teeth 151 when the motor 136 rotates in a reverse direction. It will be noted that during reverse movement of the shaft 144 (opposite the direction of the arrow 153 shown in FIGURE 6) the pawls 156 will ride over the teeth 150. The pawls 158 will all engage a tooth 151 within a quarter turn of reverse rotation.

At the end of a radiation count, the apparatus is designed to effect printing of the sample number and time elapsed whereby a permanent record for each sample will be provided. The paper tape 26 which is fed from roll 160 between guides 162 and 164 is adapted to be positioned beneath printing wheels 134 and 154 to effect the printing operation. An ink ribbon 166 is provided on feed spool 168 and is fed between tape 26 and the printing wheels to a take-up spool 170.

A solenoid 172 is provided with an armature 174 and crank means 176 is connected to this armature. When the armature is pulled in the printing pressure bar 178 located on crank arm 179 presses the paper and ribbon against the printing wheels. A return spring 181 provides for resetting of the solenoid when it is de-energized. The crank arm 176 also includes a pivotally mounted pawl 180 which engages the teeth 183 of ratchet wheel 182. The ratchet wheel is keyed to shaft 184 and is rotated in a clockwise direction when the solenoid is energized. Thus, through the operation of spring-loaded roller 186, the paper tape is advanced when the pawl 180 is operated. The wheel 182 will be locked until the next printing operation by the pawl 188.

A gear 190 is also tied to the shaft 184 and this gear serves to rotate gear 192 and bevel gears 194 and 196. The bevel gears are operatively connected to take-up spool 170 whereby the ribbon will index at the same time as the paper tape.

In the over-all operation of the apparatus, a stack of samples is loaded in the C-shaped member 28 with the lowermost holder 14 situated in the aperture 78 of the disc 74. When the motor 92 is operated, the disc will begin clockwise rotation to the radiation counting vicinity 25.

It will be noted that the apparatus includes switch means 198 and 200 located respectively above and below the disc 74. Recess 202 formed in the top face of the disc 74 and diametrically opposite recess 204 formed in the bottom of the disc 74 are adapted to operate the switches 198 and 200. Referring to FIGURE 4, it will be noted that when the aperture 78 is moved 180° to the vicinity 25, the recess 204 will move into communication with switch 200. A pin (not shown) associated with this switch will move into the recess to effect closing of the circuit stopping motor 92 and initiating radiation counting. It will be appreciated that the radiation counting cannot begin until the holder is properly in registry with the openings 80 and 81.

In the position shown in the drawing, the upper recess 202 is adjacent the upper switch 198 whereby a pin (not shown) for this switch will fall into this recess to effect stopping of the motor 92 whereby proper changing of a sample holder can take place. It will be noted that during rotation of the disc 74, the screw 42 will move downwardly although the C-shaped member 28 remains stationary since the disc 74 is blocking the magazine 12. The screw 42 is permitted to move by reason of its connection with the pin 48. When the aperture 74 again registers with the magazine, the spring 52 and the weight of the C-shaped member and holders will force it vertically downwardly to position a new holder. At this time, the rack 96 moves downwardly and the motor 92 is caused to begin its rotation as a result of this downward movement. Specifically, it will be noted that the gear 205 (see FIGURE 8) is rotated by the movement of the pinion 98 whereby rotation of cam 206 through idler 208 is effected. The recess 209 in the cam is located whereby a starting switch for the motor 92 will be operated if the rack 94 has moved downwardly a proper amount. It will be appreciated that if for some reason the rack is "hung up," the rotation of disc 74 cannot be effected.

The printing operation is, as noted, initiated through energization of the solenoid 172 and this preferably takes place through operation of means actuated by the radiation counter. Thus, when the predetermined count is reached, an impulse can be sent for energizing the solenoid, and this operation can take place while the disc 74 is returning to sample changing position. Accordingly, the printing will be effected before the sample changing changes the numbers on the printing wheels.

Reversing of the motor 136 to reset the timing wheels is preferably carried out in response to de-energization of the solenoid 172. It will thus be appreciated that the mechanism is capable of being reset before a new holder is positioned for counting.

Due to the nature of the design of the described apparatus, so called 4¶ detectors can advantageously be accommodated. Thus, the apparatus of this invention provides an essentially free operating area in the counting vicinity 25 whereby radiation counters and shields can be positioned above and below the supporting plate structures. The openings 80 and 81 provide access to both sides of a sample holder whereby a substantial increase in counting accuracy can be accomplished. It will be understood, however, that the use of 2¶ counting systems can easily be accommodated.

The operation of the recording mechanism of this invention which cooperates with the sample changing mechanisms to provide a uniquely efficient apparatus is considered to have many novel characteristics. The specific means for indicating the elapsed time, the associated printing operation and the cooperating sample number mechanisms are all believed of primary importance. The mechanical linkage between these mechanisms and the sample changing apparatus eliminates the danger of a mixup and the various switches required for initiating certain operations assure accurate cooperation between the recording and radiation counting sections.

It will be understood that various modifications may be made in the above described apparatus which provide the characteristics of this invention without departing from the spirit thereof particularly as defined in the following claims.

That which is claimed is:

1. An apparatus for the handling of radioactive samples comprising a magazine adapted to receive a plurality of holders for said samples, a radiation counter, a rotable disc mounted on an axis intermediate said magazine and said radiation counter, said disc defining an aperture adapted to receive one of said holders, motor means for rotating said discs whereby the aperture therein is adapted to communicate with said magazine, said holders being arranged in said magazine in a vertical stack, a member having upper and lower holder engaging portions disposed within said magazine whereby a stack of holders can be supported by said member means for vertically moving said member and stack in a manner such that holders with samples to be counted are moved into position for insertion in said aperture and holders for samples previously counted move out of said aperture, said motor means being adapted to rotate said disc containing a holder for a sample to be counted into position adjacent said counter and said motor means being adapted to rotate said disc to return a holder for a sample previously counted to said magazine, means for initiating a counting operation after the positioning of said holder for a sample to be counted, means for recording the number of counts per unit of time for a given sample, and whereby said apparatus is adapted to automatically continue counting all of the samples in a magazine.

2. An apparatus in accordance with claim 1 including means for automatically recording the number of samples counted, and wherein said recording means operates in response to the movement of said vertically moving means.

3. An apparatus for the handling of radioactive samples comprising a vertically disposed magazine adapted to receive a plurality of holders for said samples, a member having upper and lower holders engaging portions disposed within said magazine whereby a stack of holders can be supported by said member, drive means for vertically moving said member within said magazine, a rotary disc defining an aperture adapted to receive one of said holders, means for moving said disc whereby the aperture therein communicates with said magazine, a radiation counter, said moving means being adapted to move said disc containing said one holder into position adjacent said counter, means for initiating a counting operation after the positioning of said one holder, means for recording the counts in a time period, said moving means being adapted to return said one holder to said magazine to deposit said holder in said magazine and to receive an additional holder therefrom.

4. An apparatus in accordance with claim 3 wherein said disc is substantially equal in thickness to one of said holders whereby the holders in said magazine are spaced apart an amount approximately equal to a holder thickness when said aperture is out of communication with said magazine and whereby said disc is adapted to ride between holders in said magazine, and wherein said drive means for said member also operates the moving means for said disc.

5. An apparatus in accordance with claim 4 including means for automatically recording the number of samples counted, and wherein said recording means operate in response to operation of said drive means.

6. An apparatus for the handling of radioactive samples comprising a vertically disposed magazine, a C-shaped member having upper and lower engaging portions disposed within said magazine for supporting a stack of holders for said samples within the magazine, drive means for vertically moving said C-shaped member, a rotary disc defining an aperture adapted to receive one of said holders, said drive means also operating to move said rotary disc whereby the aperture therein can be disposed in communication with said magazine, a radiation counter, said drive means being adapted to move said disc containing said one holder into position adjacent said counter, means for initiating a counting operation after the positioning of said one holder, means for recording the time elapsed in a counting operation, said drive means being adapted to return said one holder to said magazine to deposit said holder in said magazine and to receive an additional holder therefrom.

7. An apparatus in accordance with claim 6 wherein said drive means includes a first gear and a motor operatively connected to said first gear, a second gear and a clutch means connecting said first and second gear, said second gear engaging teeth formed in said disc for driving said disc when said clutch means is engaged, a screw operatively connected to said first gear, said screw being connected to said C-shaped member whereby rotation of said first gear provides for vertical movement of the C-shaped member.

8. An apparatus in accordance with claim 7 wherein driving of said screw operates to effect downward vertical movement of said C-shaped member when said clutch means is engaged and upward vertical movement when said clutch means is disengaged.

9. An apparatus in accordance with claim 8 wherein said upward movement of said C-shaped member serves to position the stack of holders for removal from said magazine, and including means for moving the lower engaging portion of said C-shaped member upwardly above the plane of said disc whereby the lowermost holders in said stack can be reached for removal.

10. An apparatus for the handling of radioactive samples comprising a housing and an associated stationary plate, a vertically disposed magazine mounted adjacent said plate and adapted to receive a plurality of holders for said samples, a rotary disc mounted on said plate and an aperture defined in said disc adapte to receive one of said holders, means for moving said disc whereby the aperture therein can be located in communication with said magazine, a radiation counter comprising a gas flow detector, means for purging air from around a holder during movement to the vicinity of said detector, said last-mentioned means including a gas purging chamber formed in said plate in the path of movement of the aperture in said disc, means for circulating counting gas through said chamber to expel air from around said holder, said disc and said plate each being provided with facing Teflon inserts each dimensioned to extend completely over the area of said disc whereby introduction of air between said plate and said disc is inhibited, said moving means being adapted to move said disc containing said one holder into position adjacent said counter, means for initiating a counting operation after the positioning of said one holder, means operatively associated with the means for initiating counting adapted to record the time elapsed in a counting operation, said moving means being adapted to return said one holder to said magazine to deposit said holder in said magazine and to receive an additional holder therefrom.

11. An apparatus in accordance with claim 10 wherein said means for recording the time comprise a synchronous motor, a plurality of digit indicating wheels operatively connected to said motor, one of said wheels representing the lowest value digit and being adapted to be constantly rotated by said motor, ratchet teeth associated with each of said wheels, first pawl means normally engaging the ratchet teeth of the other of said wheels, means on each of said wheels for disengaging the pawl of the adjacent wheels representing a higher value digit, clutch means for permitting rotation for each of said wheels when said first pawls are disengaged, means for reversing the rotary movement of said wheels and second ratchet teeth and pawl means for each of said wheels adapted to effect resetting of said wheels at the zero position when said reversing means operates.

12. An apparatus in accordance with claim 11 including a printing wheel operatively connected to each of first indicating wheels, a printing bar and means for receiving an imprint when said printing wheels and printing bar are brought together.

13. An apparatus in accordance with claim 12 wherein said means for receiving an imprint comprises a paper tape, an ink ribbon disposed adjacent said tape, and means for automatically initiating movement of said bar after completion of said recording whereby said tape and said ribbon are pressed between said bar and said printing wheels, and means for automatically initiating movement of said tape and said ribbon, and for automatically resetting said indicating and printing wheels upon return movement of said bar.

14. An apparatus in accordance with claim 13 including sample number indicating means and printing wheels operatively associated with said last mentioned indicating means, said printing bar also operating to press said ribbon and said tape against said last mentioned printing wheels.

15. An apparatus in accordance with claim 3 including switch means positioned in the path of movement of said disc, and including means associated with said disc adapted to actuate said switch means, said switch means being operatively connected to motor means for rotating said disc whereby said motor means will be operable to stop said disc in the proper position for counting and for reloading of said aperture.

16. An apparatus in accordance with claim 3 including means for controlling the operation of the moving means for said disc whereby the aperture defined in said disc is adapted to stop at said magazine for depositing a holder and for receiving an additional holder, and including means for restarting said motor in response to the operation of means for depositing a new holder in said aperture.

17. An apparatus in accordance with claim 3 wherein said radiation counter comprises a gas flow detector, and including means for purging air from around a holder during movement of a holder to the vicinity of said detector, said last mentioned means including a gas purging chamber formed in said plate in the path of movement of the aperture in said disc, and including means for circulating counting gas through said chamber to expel air from around the holder in said aperture.

References Cited by the Examiner

UNITED STATES PATENTS

| | | | |
|---|---|---|---|
| 1,437,112 | 11/1922 | Lepine | 88—28 |
| 2,843,753 | 7/1958 | Meeder | 250—106 |
| 2,917,634 | 12/1959 | Barnothy | 250—106 |
| 3,038,078 | 6/1962 | Kern | 250—106 |

RALPH G. NILSON, *Primary Examiner.*

ARCHIE R. BORCHELT, *Examiner.*